(12) United States Patent
Johnson

(10) Patent No.: US 11,209,316 B2
(45) Date of Patent: Dec. 28, 2021

(54) TEMPERATURE MEASUREMENT BY INFRARED ANALYSIS

(71) Applicant: Infrared Medical Technologies LLC, Bellerose Village, NY (US)

(72) Inventor: Timothy Johnson, New York, NY (US)

(73) Assignee: Thermowand Technologies, Inc., New York, NY (US)

( * ) Notice: Subject to any disclaimer, the term of this patent is extended or adjusted under 35 U.S.C. 154(b) by 30 days.

(21) Appl. No.: 16/678,235

(22) Filed: Nov. 8, 2019

(65) Prior Publication Data

US 2020/0088584 A1    Mar. 19, 2020

Related U.S. Application Data

(63) Continuation-in-part of application No. 15/675,235, filed on Aug. 11, 2017, now Pat. No. 10,502,629.

(Continued)

(51) Int. Cl.
*G01J 5/00* (2006.01)
*G01J 5/02* (2006.01)
*G01J 5/10* (2006.01)

(52) U.S. Cl.
CPC .............. *G01J 5/025* (2013.01); *G01J 5/10* (2013.01)

(58) Field of Classification Search
CPC ......... A61B 5/015; A61B 5/01; A61B 5/0077; A61B 5/742; A61B 2576/02; A61B 5/743;

(Continued)

(56) References Cited

U.S. PATENT DOCUMENTS

| 4,928,014 A | 5/1990 | Rosenthal |
| 5,219,226 A * | 6/1993 | James ................... G01J 5/02 |
| | | 345/167 |

(Continued)

FOREIGN PATENT DOCUMENTS

| DE | 202004019441 | 6/2005 |
| JP | 2005148038 | 6/2005 |

(Continued)

OTHER PUBLICATIONS

PCT International Preliminary Report on Patentability in International Appln. No. PCT/US2017/046549, dated Feb. 12, 2019, 10 pages.

(Continued)

*Primary Examiner* — Gail Kaplan Verbitsky
(74) *Attorney, Agent, or Firm* — Brian M. Gaff, Esq.

(57) ABSTRACT

A method of determining a temperature of a subject while not in physical contact with the subject. The method includes providing an infrared sensor oriented to receive the infrared radiation emanating from a subject and to generate at least one output that corresponds to the received infrared radiation, providing a processor to process the at least one output into a computed temperature of the subject, adjusting the computer temperature based on an emissivity of the subject, the emissivity determined at least in part by a luminance value based at least in part on an image of the subject providing a memory module to store a first plurality of computed temperatures in a predetermined sequence, and selecting a first maximum from among the first plurality of computed temperatures. A display is provided to display the temperature of the subject.

3 Claims, 5 Drawing Sheets

Related U.S. Application Data

(60) Provisional application No. 62/374,700, filed on Aug. 12, 2016, provisional application No. 62/471,901, filed on Mar. 15, 2017.

(58) Field of Classification Search
CPC ........ A61B 2017/00084; A61B 5/0064; A61B 5/6887; A61B 1/247; A61B 2017/00053; A61B 2018/00791; A61B 2562/0271; A61B 5/0086; G01J 2005/0077; G01J 2005/0081; G01J 5/025; G01J 5/0011; G01J 2005/068; G01J 2005/0085; G01J 5/0014; G01J 5/10
See application file for complete search history.

(56) References Cited

U.S. PATENT DOCUMENTS

| | | | |
|---|---|---|---|
| 6,662,048 B2 | 12/2003 | Balczewski et al. | |
| 7,340,293 B2 | 3/2008 | McQuilkin | |
| 8,110,803 B2* | 2/2012 | Hollander | G01J 5/089 250/338.1 |
| 8,167,483 B2 | 5/2012 | Jensen | |
| 8,452,382 B1 | 5/2013 | Roth | |
| 8,483,990 B2* | 7/2013 | Warnke | H04N 5/23293 702/132 |
| 8,795,168 B2* | 8/2014 | Goh | A61B 5/1113 600/301 |
| 8,825,112 B1 | 9/2014 | Fraden et al. | |
| 8,923,954 B2 | 12/2014 | Herman | |
| 9,307,912 B2 | 4/2016 | Mullin et al. | |
| 9,375,149 B2 | 6/2016 | Lane et al. | |
| 9,506,809 B2 | 11/2016 | Shin | |
| 10,383,604 B2* | 8/2019 | Pardey | A61B 5/0008 |
| 10,502,629 B2 | 12/2019 | Johnson et al. | |
| 2002/0193703 A1 | 12/2002 | Sato et al. | |
| 2006/0122473 A1* | 6/2006 | Kill | G01K 1/024 600/300 |
| 2007/0153871 A1 | 7/2007 | Fraden | |
| 2007/0219434 A1* | 9/2007 | Abreu | A61B 5/02055 600/301 |
| 2008/0259993 A1* | 10/2008 | Blakeley | G01J 5/04 374/121 |
| 2009/0077508 A1* | 3/2009 | Rubin | G06F 30/367 716/136 |
| 2009/0125330 A1* | 5/2009 | Sebban | G16H 40/67 705/3 |
| 2009/0250611 A1 | 10/2009 | Strandemar | |
| 2011/0178408 A1 | 7/2011 | Rosenthal | |
| 2011/0263950 A1 | 10/2011 | Larson et al. | |
| 2013/0230074 A1 | 9/2013 | Shin | |
| 2013/0235901 A1 | 9/2013 | Shin | |
| 2014/0003463 A1 | 1/2014 | Jackson et al. | |
| 2014/0171805 A1* | 6/2014 | Mullin | A61B 5/01 600/474 |
| 2014/0333439 A1* | 11/2014 | Downing | G01K 13/223 340/573.3 |
| 2015/0168233 A1 | 6/2015 | Ho | |
| 2015/0196203 A1 | 7/2015 | Abreu | |
| 2015/0211941 A1 | 7/2015 | Roth | |
| 2016/0073908 A1 | 3/2016 | Khachaturian et al. | |
| 2016/0143630 A1 | 5/2016 | Pardey et al. | |
| 2016/0265982 A1 | 9/2016 | Bachand et al. | |
| 2016/0345832 A1 | 12/2016 | Pavagada Nagaraja et al. | |
| 2017/0270659 A1* | 9/2017 | Venkataramani | G06T 7/0012 |
| 2018/0000461 A1 | 1/2018 | Venkatarannani et al. | |
| 2018/0120164 A1* | 5/2018 | Bouchkour | B32B 27/065 |
| 2019/0110692 A1* | 4/2019 | Pardey | A61B 5/7282 |
| 2021/0197233 A1* | 7/2021 | Ketterer | B25J 9/1664 |
| 2021/0219855 A1* | 7/2021 | Misharin | G06T 7/0012 |

FOREIGN PATENT DOCUMENTS

| | | |
|---|---|---|
| JP | 2014135993 | 7/2014 |
| WO | WO2008110949 | 9/2008 |

OTHER PUBLICATIONS

PCT International Search Report and Written Opinion in International Appln. No. PCT/US2017/046549, dated Nov. 20, 2017, 12 pages.

* cited by examiner

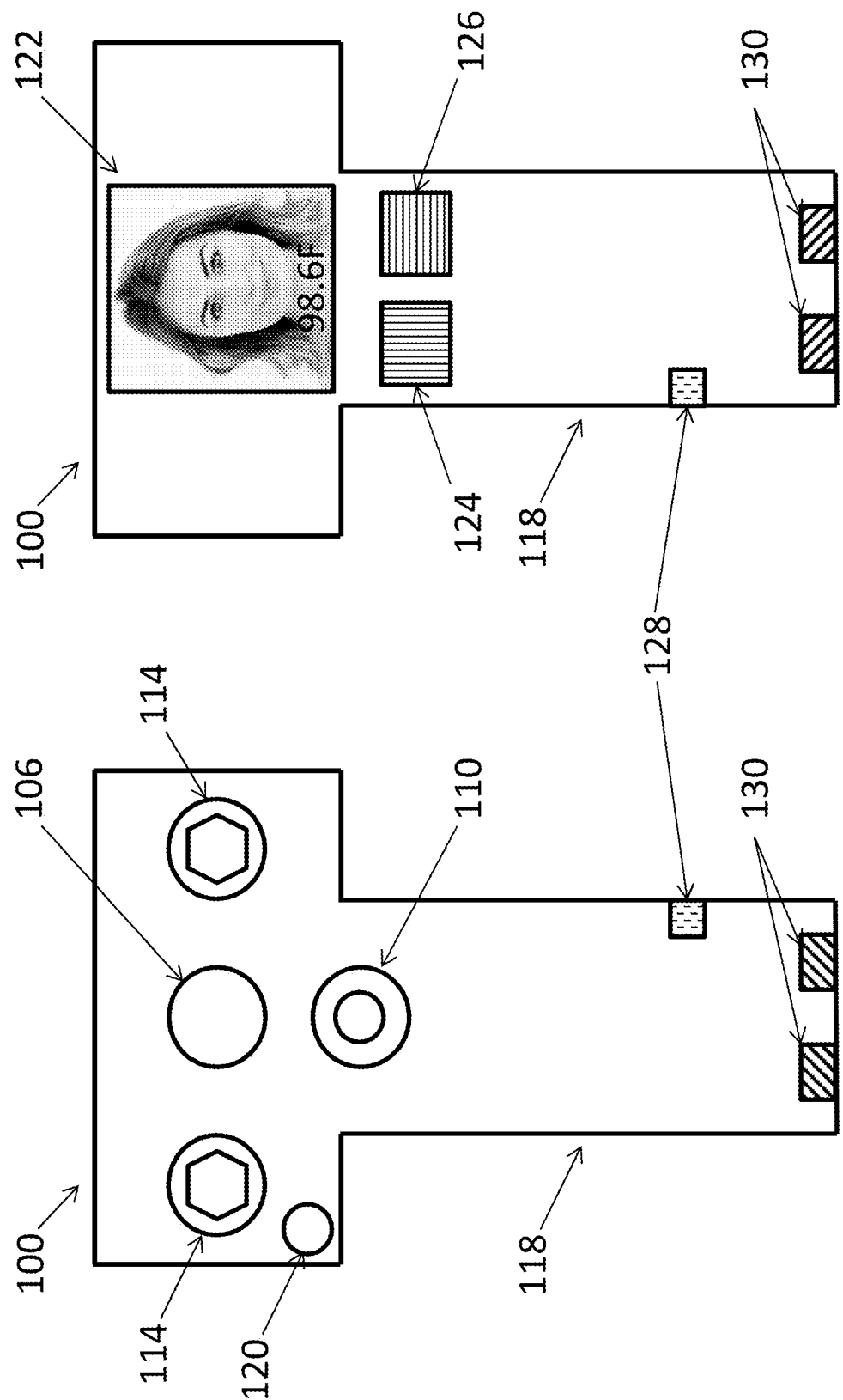

TEMPERATURE MEASUREMENT BY INFRARED ANALYSIS

CROSS-REFERENCE TO RELATED APPLICATIONS

The present disclosure is related and claims priority to U.S. Provisional Pat. Appl. No. 62/374,700, filed on Aug. 12, 2016, U.S. Provisional Pat. Appl. No. 62/471,901, filed on Mar. 15, 2017, and U.S. patent application Ser. No. 15/675,135 filed on Aug. 11, 2017, the contents of each of which are hereby incorporated by reference in their entirety, for all purposes.

BACKGROUND

Field of Disclosure

Embodiments described herein are generally related to the analysis of infrared radiation emanating from an object. More specifically, embodiments described herein are related to systems and methods for non-contact temperature measurement of an object through the analysis of the infrared radiation. One or more of these embodiments may be employed to measure the temperature of human and non-human subjects without contacting the subjects and at a significant distance from the subjects.

Related Art

Current systems for temperature measurement of an object require contacting the object or allow for only a minimal separation between the measuring device and the object. In many instances it is desirable or required that there be a significant separation between the measuring device and the object. For example, during temperature screening of large populations where communicable disease might be present. Therefore, it is desirable to have systems and methods that provide high-accuracy and high-speed temperature measurements from a distance.

SUMMARY

In one embodiment, a device for detecting infrared radiation emanating from a subject while not in physical contact with the subject includes an infrared sensor located in the body of the device that is oriented to receive the infrared radiation and to generate at least one output that corresponds to the received infrared radiation. The device also includes an analog to digital converter (ADC) in communication with the infrared sensor to receive the at least one output and a processor in communication with the ADC or the infrared sensor to compute a temperature associated with the subject. A memory module stores a first plurality of computed temperatures in a predetermined sequence and a filter module selects a first maximum from among the first plurality of computed temperatures.

In another embodiment, a method of determining the temperature of a subject includes providing an infrared sensor oriented to receive infrared radiation emanating from the subject and that sensor generating at least one output that corresponds to the received infrared radiation. The method also includes providing a processor to compute a temperature associated with the subject based at least in part on the at least one output and providing a memory module in which a first plurality of computed temperatures in a predetermined sequence are arranged (i.e., stored). The method includes selecting three maxima from among datasets and showing on a display the subject's temperature that is based on one or more of these maxima.

BRIEF DESCRIPTION OF THE DRAWINGS

FIG. 1B illustrates a device for measuring infrared radiation from a subject, depicted from the subject's perspective, according to some embodiments.

FIG. 1C illustrates a device for measuring infrared radiation from a subject, depicted from the device operator's perspective, according to some embodiments.

In the figures, elements and steps denoted by the same or similar reference numerals are associated with the same or similar elements and steps, unless indicated otherwise.

DETAILED DESCRIPTION

The detailed description set forth below is intended as a description of various implementations and is not intended to represent the only implementations in which the subject technology may be practiced. As those skilled in the art would realize, the described implementations may be modified in various different ways, all without departing from the scope of the present disclosure. Accordingly, the drawings and description are to be regarded as illustrative in nature and not restrictive.

Embodiments of the invention as disclosed herein measure the temperature of a subject without the need to be in contact with, or in close proximity to, the subject. Embodiments of the invention are alternatives to temperature measurement systems that rely on making contact with the subject or rely on getting close to the subject, which might be ill-advised in some circumstances. For example, if the subject is a human patient, it might be desirable, or consistent with infectious disease protocols, to maintain a safe distance to the patient. Embodiments of the invention measure the temperature of the subject from several feet away. This eliminates the need for someone, e.g., a medical professional, to approach the patient, typically to within a few inches, or even make physical contact with the patient, to get the temperature measurement.

The device-to-subject distance that embodiments of the invention provide is useful when the subject is non-human. For example, embodiments of the invention allow one to take the temperature of an animal (e.g., livestock) while maintaining a safe distance away from the animal.

Figure 1A:
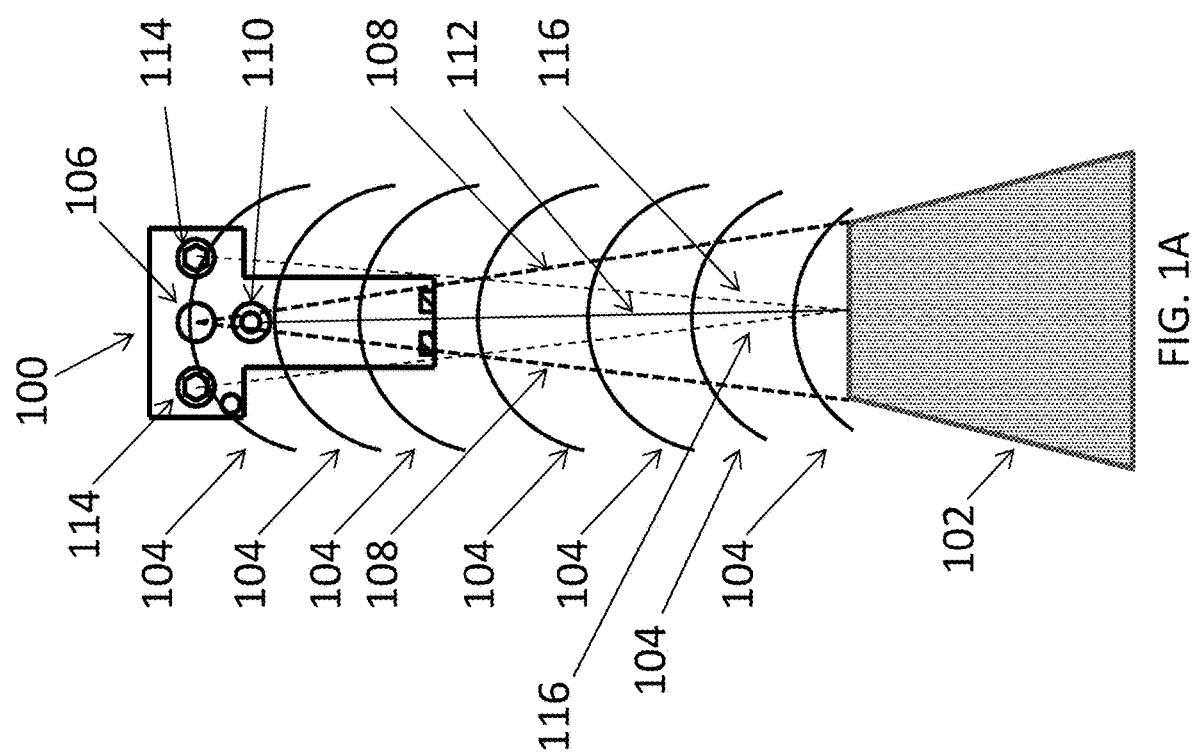
FIG. 1A illustrates a device for measuring infrared radiation from a subject in operation, according to some embodiments.

FIG. 1A illustrates a device 100 for measuring infrared radiation from a subject 102 in operation, according to some embodiments. The subject 102 emanates infrared radiation (IR), typically in a series of wavefronts 104, in relation to its temperature. A sensor 106 captures the IR within a three dimensional conical field of view 108.

The device 100 includes a camera 110 that acquires an image of the subject 102 along a line of sight 112. In some embodiments the image is used to determine whether the device 100 is oriented correctly relative to the subject 102. That is, whether the sensor 106 is directed at the proper target on the subject 102. In the case of a human subject, that target could be the subject's forehead. In some embodiments, discussed further below, the image is presented to the operator of the device on a display. This allows the operator to reorient the device 100 as needed while viewing the display to ensure the proper alignment. In other embodiments the image is processed within the device 100 to determine the current orientation and the device 100 corrects the data that the sensor 106 obtains to account for that orientation, typically without the operator's intervention. This image processing would typically include hardware and/or software based facial recognition capability to e.g., discern facial features.

In another embodiment the device 100 positions itself autonomously to orient itself correctly relative to the subject 102. This may be accomplished by using linear and/or rotary actuators and information concerning distance to the subject 102 and the temperature being observed. The linear and/or rotary actuators max be built into the device 100 or external to the device 100. Typically, the actuators are part of an X/Y carriage and the device 100 is mounted to the carriage.

In some embodiments the device 100 uses the acquired image to compute the distance between the device 100 and the subject 102. This distance is a factor in determining whether device is within range to yield a proper temperature reading. For example, if the device 100 is greater than a maximum distance away from the subject 102, it alerts the operator to move closer to the subject 102. The alert is visual (e.g., lighted indicators or a message on a display to indicate proximity), and/or audible (e.g., a tone or a spoken command to "move closer"). A speaker, integrated into the device 100 or remote to the device 100 emits the audible alerts. The alerts can be based on conditions other than distance, e.g., a high temperature of the subject 102.

In other embodiments the device 100 includes a rangefinder 114 to determine the distance to the subject 102. This is an alternative to relying on an image from the camera 110 to determine the distance. In some embodiments the rangefinder uses ultrasonic beams 116 to determine the distance. The rangefinder 114 can include an ultrasonic transmitter that is separate from an ultrasonic receiver as shown in FIG. 1A. In other embodiments the function of the rangefinder 114 is integrated into a single component. Still other embodiments use other modalities such as laser (e.g., LIDAR) and radar as alternatives to ultrasound to determine distance.

In some embodiments the device 100 orients itself into the proper alignment with the subject 102 in the following manner, which may be dependent on a default resting positon of the device 100:

1. The subject 102 approaches a stand upon which the device is mounted.
2. The subject 102 stands on a marking on the floor, or sits in a chair, or places his face into a fixture.
3. The device 100 determines the distance to the subject 102 using the rangefinder 114.
4. Using rotary actuators, the device 100 is tilted to allow the camera 110 to detect the face of the subject 102.
5. Using a vertical mounted linear actuator associated with an X/Y carriage, the device 100 moves to a position level with the face of the subject 102.
6. Using a horizontal mounted linear actuator associated with an X/Y carriage, the device 100 moves to a position directly in front of the face of the subject 102.
7. Using the sensor 106 to confirm the presence of a subject 102, the final adjustments of the device position (X, Y) and tilt (vertical and horizontal) is dictated by the distance the face of the subject 102 is from the device. Typically, the Field of View at a thirty six inch distance from the subject 102 is approximately three inches.
8. The device 100 takes the necessary measurements and computes the temperature.
9. The device 100 can emit voice announcements to inform the subject 102 and/or operator about the status of the temperature measurement and/or provide instructions for conducting the temperature measurement. For example, in some embodiments the device 100 can detect (e.g., using image processing in conjunction with the camera 110) whether the subject 102 is wearing apparel (glasses, hat, etc.) that might interfere with the temperature measurement. In such instances the device 100 can emit a voice announcement directing the subject 102 to remove the associated apparel.

In another embodiment the subject 102 approaches the device 100 that is mounted on a track, adjusts the device level until the subject's eyes can be seen in a mirror, and then presses a start button. At that point the device 100 may make a final adjustment then takes the subject's temperature.

In some embodiments, e.g., those including autonomous operation, the device 100 moves to sequentially examine regions of the subject 102. This is to account for the movement of the heat radiating from the subject 102. In such embodiments, the device 100 tracks the movement of the wavefronts 104 and includes the effect of that movement when determining the subject's temperature, typically after completing the sequential examination of the regions of the subject 102.

FIG. 1B illustrates the device 100 in greater detail, depicted from the subject's perspective, according to some embodiments. This perspective or side of the device 100 is described as "distal" given that it shows the front part of the device 100 that would be pointed at the subject when being used. In some embodiments the body of the device 100 is shaped to provide a grip region 118 for the operator to grasp when in use.

In addition to the sensor 106, camera 110, and rangefinder 114, in some embodiments the device 100 includes an ambient temperature sensor 120. The ambient temperature sensor 120 can be mounted in the body of the device 100, or it could be external to the device 100 and configured to communicate wired or wirelessly with the device 100. The ambient temperature sensor 120 could be integrated into another component in the device 100, such as the sensor 106. In any case, the ambient temperature sensor 120 monitors the temperature in the area where the device 100 and the subject 102 are located. If the device 100 determines that the ambient temperature is outside of prescribed limits, e.g., if the ambient temperature is greater than the expected temperature of the subject 102, the device 100 alerts the operator, visually and/or audibly, that it cannot determine an accurate temperature.

FIG. 1C illustrates the device 100 from the operator's perspective, according to some embodiments. This perspective or side of the device 100 is described as "proximal" given that it shows the rear part of the device 100 that would be facing the operator when in use.

In some embodiments the device 100 includes a display 122 integrated into the body of the device 100. The display 122 is configured to show the temperature of the subject 102 that the device 100 determines. In this configuration the display 122 is a numeric readout and/or lighted indicators such as LEDs that show temperature ranges, e.g., high, normal, low. In other embodiments the display 122 is not integrated into the body of the device 100, but instead is located remotely from the device 122, e.g., in a central viewing area, and configured to communicate wired or wirelessly with the device 100.

In embodiments that include the camera 110, the display 122 is configured to show the image that the camera 110 acquires of the subject 102. By looking at the display the operator can ensure the proper alignment of the device 100 relative to the subject 102. In some embodiments the device 100 overlays cursors and/or other indicators on the displayed image to help with the alignment. The cursors and/or other indicators respond to the operator's attempt to get the proper alignment, thereby providing feedback to guide the operator.

In another embodiment the rangefinder 114 emits one or more light beams at one or more wavelengths that are invisible to the human eye but visible to the camera 110 and shown on the display 122. Multiple beams are oriented to intersect at a specific distance away from their respective transmitters, e.g., thirty-six inches. The operator sees this intersection on the display 122 and moves the device 100 such that the intersection is on the surface of the subject 102. This optimizes the distance between the sensor 106 and subject 102 to enhance the accuracy of the temperature measurement.

In some embodiments, a single display 122, such as an LCD graphics display, is configured to show both the temperature and the acquired image. In other embodiments, separate displays are used; for example, one graphics display to show the acquired image and a numeric readout and/or one or more LEDs to show various temperature ranges, with the LED lit that corresponds to the temperature of the subject 102.

In some embodiments the display 122 provides visual alerts to the operator. For example, the display 122 shows a message relating to the distance between the device 100 and the subject 102, instructing the operator to move the device 100 closer to the subject 102. In other embodiments the display 122 shows the ambient temperature and/or a message stating whether the ambient temperature is outside of prescribed limits.

In some embodiments the device 100 includes one or more switches and/or controls 124, 126. In different embodiments the switches and/or controls 124, 126 are on the proximal side, the distal side, or both sides of the device 100. The switches and/or controls 124, 126 include actuators to turn the device 100 on and off. They include a trigger to initiate a temperature measurement. They operate to recall past measurements and/or change the configuration of the device by changing one or more of its settings, e.g., to change temperature scales (Fahrenheit versus Celsius). In some embodiments the operator of the device may enter information related to the emissivity of the subject 102. In other embodiments the display 122 operates as a touchscreen such that one or more functions of the switches and/or controls 124, 126 are performed by touching a region on the display 122.

In some embodiments temperature measurements and other data that the device 100 acquires are stored in memory in the device 100. Typically, these data are uploaded to a repository (e.g., the cloud) for further analysis. The upload can performed wirelessly via, e.g., a Wi-Fi or cellular connection between the device 100 and the repository. In other embodiments the connection is wired, with the data output at a port 128, such as a USB port or an Ethernet port. In certain embodiments a host device such as a personal computer is between the device 100 and the repository to facilitate and/or provide the connection.

Figure 2:
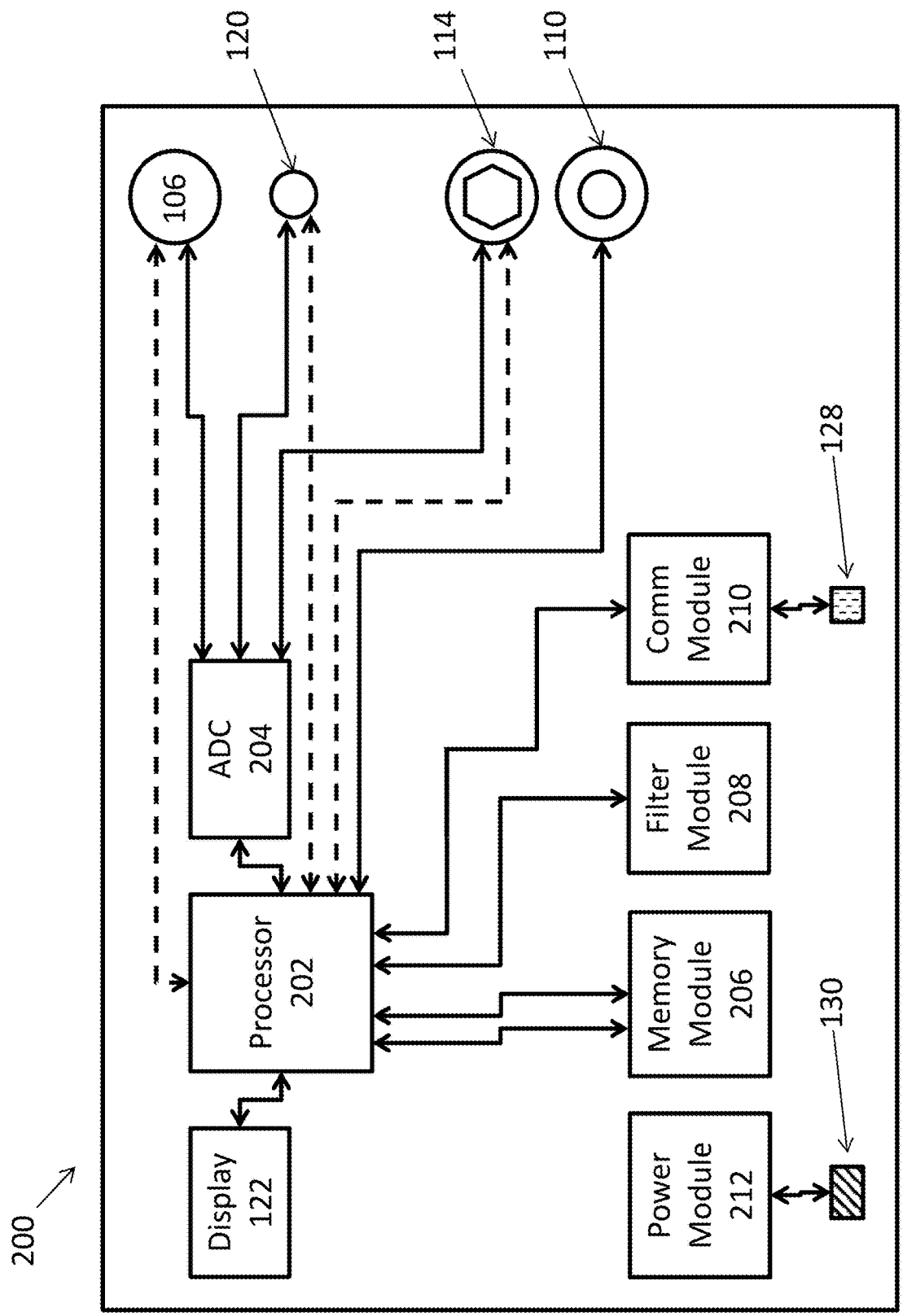
FIG. 2 illustrates a block diagram of a device for measuring infrared radiation from a subject according to some embodiments.

FIG. 2 illustrates a block diagram 200 of the device 100, according to some embodiments. The sensor 106 typically includes a thermopile that responds to received IR and generates a corresponding analog signal. After suitable amplification, the analog signal passes to an ADC 204. In some embodiments the ADC 204 is integrated with the sensor 106 as a single component. In this configuration the output of the single component is a digital signal transmitted to a processor 202 via a bus. In either configuration, the output of the ADC 204 is passed to the processor 202 for further signal processing and computation of the temperature of the subject 102. Buses used in some embodiments include an $I^2C$ bus. Alternative bus connections are shown in FIG. 2 as dashed lines.

In still other embodiments the sensor 106 includes not only the ADC 204, but also a processor (e.g., a signal processor) and associated signal processing hardware such as filters and a modulator, integrated into a single component. In this configuration the sensor 106 outputs a computed temperature reading based on the IR received. This allows the sensor 106 to read the IR emanations 104 and process them into temperature readings at high speed; e.g., at three hundred readings and computed temperature readings per second. Such an integrated sensor 106 reduces the computational burden on the processor 202, e.g., the processor 202 need not compute temperatures based on raw sensor readings, including those readings passed through the ADC 204. In this configuration the processor 202 processes the output of the integrated sensor 106 into a computed temperature by, e.g., arranging sequences of readings and contributing to the selection of maxima, as described below.

In embodiments that include the ambient temperature sensor 120, its output is passed to the ADC 204 and then to the processor 202. In configurations where the ambient temperature sensor 120 includes an ADC and, optionally, other associated signal processing hardware, the output of the ambient temperature sensor 120 is a digital signal transmitted to the processor 202 via a bus.

In embodiments that include the camera 110, a digital signal representing the image that the camera 110 acquires is passed to the processor 202 via a bus. Similarly, distance data determined by the rangefinder 114 is passed to the processor 202 via a bus. In instances where the output of the rangefinder is an analog signal, that signal is first passed to the ADC 204 before being passed to the processor 202. In configurations where the rangefinder 114 includes an ADC and, optionally, other associated signal processing hardware, the output of the rangefinder 114 is a digital signal transmitted to the processor 202 via a bus.

In some embodiments the processor 202 interfaces to a memory module 206 via a bus. The memory module 206 can be integrated with the processor 202, e.g., configured as one or more registers, and/or include one or more separate components. In some embodiments it includes multiple types of memory devices for storing different content. For example, nonvolatile memory included in the memory module 206 would typically store the software code for the operating system for the processor 202 as well as software code for an application program running on the processor 202. In certain embodiments the IR readings from the sensor 106 and/or the temperature readings computed from those IR readings are stored in the memory module 206, typically in volatile memory. Alternatively, the readings are stored in nonvolatile memory, including on removable devices such as an SD card or memory stick. In either case, the data includes multiple computed temperature readings based on multiple IR readings acquired in a short period, e.g., three hundred readings acquired in one second.

In some embodiments, a filter module 208 interfaces with and cooperates with the processor 202 to further process the computed temperatures. After further processing the temperature of the subject 102 appears on the display 122. Such further processing includes arranging the IR readings and/or the corresponding computed temperature readings in a predetermined sequence in the memory module 206. In certain embodiments the predetermined sequence is time-ordered, i.e., the IR readings and/or the corresponding computed temperature readings are stored in the order in which they were received and/or computed. The further processing includes selecting the maximum IR reading and/or the corresponding computed temperature reading from those stored in the memory module 206 within a defined period, e.g., the maximum of a first group of three hundred readings taken in a one second interval.

That maximum value is shown on the display 122 as the temperature of the subject 102. However, in other embodiments the further processing includes examining a second group of IR readings and/or the corresponding computed temperature readings stored in the memory module 206. This second group of readings typically includes readings taken after the first group, e.g., another three hundred readings taken in one second after the first one second interval. A first dataset that includes the second group of readings and the maximum of the first group is examined and a maximum value of that first dataset is determined (i.e., the second maximum). That second maximum value is shown on the display 122 as the temperature of the subject 102.

In certain embodiments the further processing includes repeating the process and examining a third group of IR readings and/or the corresponding computed temperature readings stored in the memory module 206. This third group typically includes readings taken after the second group, e.g., another three hundred readings taken in one second after the second one second interval. A second dataset that includes the third group of readings and the second maximum is examined and a maximum value of that second dataset is determined (i.e., the third maximum). That third maximum value is shown on the display 122 as the temperature of the subject 102.

Selecting a maximum value by the filter module 208 in cooperation with the processor 202 is ideally done at the highest speed that these components can achieve. In some embodiments the application software running on the processor 202 exploits this by determining maximum values through the comparison of one value with its nearest neighbor values. In other words, one value is compared to its immediately preceding and/or immediately subsequent value stored in sequence in the memory module 206. Whichever is largest—the initial value, the immediately preceding value, or the immediately subsequent value—is retained as the new maximum. This process is repeated, comparing the new maximum with the next sequential value, until all relevant values in the memory module 206 are compared and a final maximum value is determined.

The temperature of the subject 102 is shown on the display 122 is typically based on at least one of the first maximum, the second maximum, or the third maximum, e.g., as an average of these three maxima. However, selecting and showing the final maximum as the temperature of the subject 102 enhances the accuracy of the device 100. In the case of a human subject, the sensor 106 sees the subject's face as the heat source within the conical field of view 108. The speed at which the IR readings and/or the corresponding computed temperature readings are acquired (e.g., at three hundred readings per second) and processed results in eliminating potential errors in the displayed temperature. For example, ambient airflows within the conical field of view 108 are generally unrelated to the subject's temperature. The sensor 106 might detect the temperatures of these airflows as well as the temperature of the subject 102. The airflow temperatures are typically lower than the subject's temperature, and this can create an error in the computation of the subject's temperature. However, by rapidly determining the maximum reading from a series of datasets, e.g., datasets that include nine hundred readings acquired and/or determined in three seconds, the effect of ambient airflows on the displayed temperature is reduced or eliminated.

A communications module 210 interfaces with the processor 202 to give the device 100 the ability to transmit and receive data to and from an external source wirelessly and/or non-wirelessly (e.g., using hardwired connections). The communications module 210 can be integrated into the processor 202 or be a separate component. In some embodiments IR readings and computed temperature readings are uploaded to a cloud-based repository for further analysis and/or recordkeeping. Operating system and/or application software updates, as well as configuration data (e.g., temperature scale settings, communication settings, power settings, operational parameters, etc.), are downloaded to the device 100. Data concerning or identifying the subject 102 are exchanged as well. In embodiments where the communication is wired, the wired connection is made at port 128 that interfaces with the communications module 210. In some embodiments the communications module 210 includes an embedded web server to facilitate communication with the device 100. In such embodiments the device 100 would be connected to a network and have a unique IP address. The status and/or signal strength of the wireless or non-wireless connection is shown on the display 122, e.g., by using icons similar to those used on smartphones.

The device 100 typically includes a power supply module 212 integrated into the body of the device 100 that includes a rechargeable battery with external charging ports 130. The external charging ports 130 are designed to mate with a cradle and/or holder that provide power to recharge the battery. Alternatively, inductive (i.e., non-contact) charging provides the recharging power. In other embodiments the port 128 operates to recharge the battery, e.g., by connecting a USB charging cord to the port 128. In some embodiments the display 122 shows the status of the power supply of the device 100, e.g., the amount of charge remaining in a battery, whether charging is required, and whether charging is underway.

Underlying Theory

The theory describing the heat energy that a body (e.g., the subject 102) radiates is a basis for the operation of device 100. The following formula describes the heat energy radiated per unit time (radiated power $P_{rad}$):

$$P_{rad} = e\sigma A(T_{hot}^4 - T_{cold}^4) \qquad \text{(Eq. 1)}$$

Where e is the emissivity of the body, σ is the Stefan-Boltzmann constant, A is the area of the body from which the heat energy is radiating, $T_{hot}$ is surface temperature of the body, and $T_{cold}$ is the ambient temperature.

If the subject 102 is human, the area A typically includes the subject's face. The area is related to the distance between the sensor 106 and the subject 102 and the field of view 108. Assuming a distance of thirty-six inches and field of view 108 corresponding to five degrees, the sensor will see a circular spot on the subject 102 having a radius of approximately 1.5 inches. The resulting area of the spot is approximately 7.1 square inches.

A subject that is a perfect black body radiator—where the subject radiates all heat that it generates—has an emissivity value of 1.0. Most subjects, however, will have emissivity values less than 1.0. One factor that affects a subject's emissivity is the subject's external color, i.e., its color scheme. In the case of a human subject, the color scheme is related to the human subject's complexion.

The sensor 106 measures the radiated power. With knowledge of the ambient temperature $T_{cold}$ and an assumed value for the emissivity, Eq. 1 is solved for $T_{hot}$.

Emissivity may, be determined in connection with input from the device operator. For example, in some embodiments the operator can associate the subject 102 with one of the six skin color types of the Fitzpatrick scale and enter the corresponding type number (I through VI) into the device 100 using switches and/or controls 124, 126, or by touching a region on the display 122. The processor 202 then selects an emissivity value, e.g., from a lookup table, based on the type number and uses it in Eq. 1 to compute $T_{hot}$. Exemplary emissivity values include the following:

| Fitzpatrick Scale Type Number | Emissivity |
| --- | --- |
| I | 0.95 |
| II | 0.96 |
| III | 0.97 |
| IV | 0.98 |
| V | 0.99 |
| VI | 1.00 |

Some embodiments improve on the computation of $T_{hot}$ wherein the processor 202 processes the image of the subject 102 that the camera 110 acquires to determine the image's color components, e.g., its RGB values. The typical resolution is eight bits per color component.

The color components are converted to grayscale, or another color system, such as HSL, that allows for the extraction of luminance. (Alternatively, the HSV color system can be used and the value parameter can be extracted and used instead of the luminance parameter.) Once luminance (or HSV value parameter) is extracted, the processor 202 compares it against a lookup table of luminance (or HSV value parameter) versus emissivity. The extracted luminance (or HSV value parameter) can be an individual value. e.g., for a pixel or can be an average of a plurality of values corresponding to a plurality of pixels. In some embodiments a one-to-one linearized transformation converts the value or average value into emissivity. The processor 202 selects the emissivity that best corresponds to the extracted luminance. This revised emissivity is used in Eq. 1 to compute $T_{hot}$.

In some embodiments data comprising the image of the subject 102 and the computed temperature $T_{hot}$ are collected from one or more devices 100 and uploaded to a repository. These data may be analyzed, e.g., to develop an improved lookup table of luminance (or HSV value parameter) versus emissivity. The improvement results from, among other things, having data from a large number of subjects. To protect confidentiality, data are typically anonymized, e.g., by cropping the image of the subject 102 to eliminate identifying characteristics. In some embodiments improvements (e.g., a revised lookup table) are downloaded to the device 100 to enhance its performance.

Figure 1D:
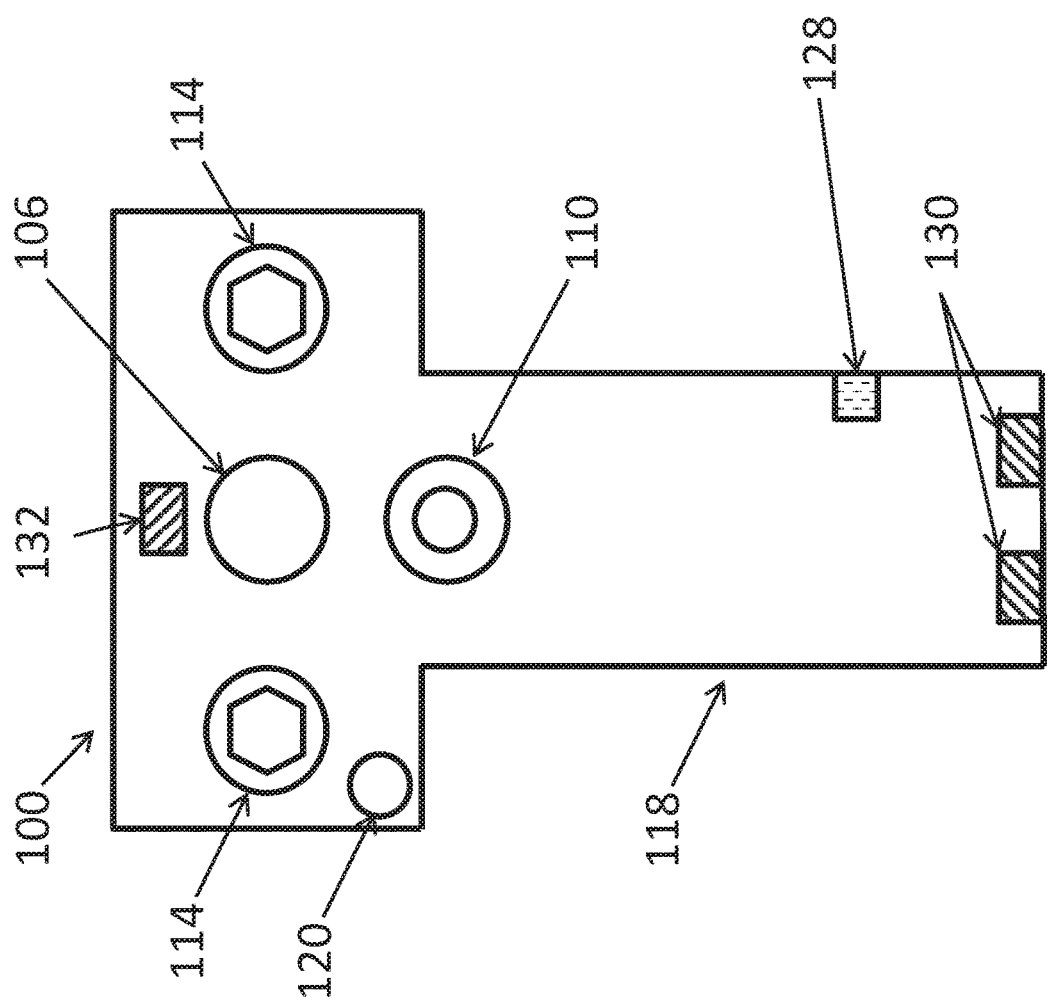
FIG. 1D illustrates a device for measuring infrared radiation from a subject, depicted from the subject's perspective, according to some embodiments.

Differences in ambient lighting of the subject 102 can result in unacceptable variations in the determination of emissivity. To remedy this, some embodiments include an illuminator 132 as shown in FIG. 1D. The illuminator 132 provides standardized or controlled illumination of the subject 102. This can include illumination by one or more specific wavelengths of light. The illuminator 132 may be continuously or intermittently as needed. The operator may activate the illuminator 132 or the device may do so automatically, e.g., based on a reading of the ambient lighting by the camera 110. Activation may be limited to the time the device 100 is measuring the infrared radiation from the subject 102.

The actual surface temperature ($T_{surface}$) of the subject 102 (e.g., skin temperature of the human subject) is typically lower than the computed $T_{hot}$ value due to heat loss ($H_{loss}$) occurring in the region between the subject 102 and the sensor 106, i.e., within the conical field of view 108. The following formula describes this:

$$T_{surface} = T_{hot} + H_{loss} \qquad (Eq.\ 2)$$

The heat loss can be described as an air column that looks like a cone set on its side with the large end surrounding an area on the subject 102 and the small end at the point of entry into the sensor 106. (This corresponds to the conical field of view 108.) Typically, there are four inputs into this air column: (1) the actual surface (skin) temperature, (2) the emissivity, (3) extraneous hot and/or cold air drafts, and (4) the distance (length) of the air column, which corresponds to the distance between the subject 102 and the sensor 106, e.g., along the line of sight 112.

Of these four inputs, the actual surface (skin) temperature changes slowly and the emissivity and distance are constants. The extraneous air drafts typically change slowly. Because the readings are rapid, e.g., three hundred per second, effects due to the drafts can be observed and eliminated (e.g., filtered out).

In some embodiments the processor 202 compensates for the effect of the distance between the subject 102 and the sensor 106. Once the device 100 measures the distance to the subject 102, the processor 202 compares that distance against a lookup table of temperature offsets versus distance. The processor 202 selects the offset that best corresponds to the measured distance and adjusts the computed temperature accordingly.

Although the initial calculation of $T_{hot}$ according to Eq. 1 is accurate, certain embodiments provide compensation of the calculated value that increases its accuracy. Acknowledging the effects of heat loss through the conical field of view 108, variations in emissivity of the subject 102, and changes in distance between the subject 102 and the sensor 106, and adjusting the value of $T_{hot}$ accordingly, is an advantage provided by certain embodiments of the invention. Some embodiments introduce one or more additional offsets, e.g., an offset to convert $T_{surface}$ to the subject's core temperature, so as to show the latter on the display 122. In the case where the subject 102 is a human patient, the relationship between $T_{surface}$ and the core temperature is characterized by offsets that depend on the location of temperature measurement. Table 1 sets forth some of these approximated offsets, which can be stored in the device 100 in a lookup table.

TABLE 1

| Location of Measurement | Offset to Calculate Core Temperature (add to measured temperature) (° C.) |
|---|---|
| Rectal | 1.25 |
| Axilla | 1.10 |
| Ear | 0.85 |
| Forehead | 0.70 |
| Oral | 0.55 |

Refinements to the offsets and corresponding adjustments to the calculated temperature can be done by downloading new configuration data—such as new lookup tables—into the device 100.

In some embodiments the following formula, based on the Beer-Lambert Law, is used to compute $T_{surface}$:

$$-\log\left(\frac{T}{T_{surface}}\right) = kD \quad \text{(Eq. 3)}$$

Where D is the distance between the sensor 106 and the subject 102, T is the temperature that the device 100 measures, and k is a function of the distance derived from the absorption coefficient and absorber concentration of the subject 102. In some embodiments k is defined as follows:

$$k = -0.0033D - 0.0086 \quad \text{(Eq. 4)}$$

Therefore, measuring the value of T and knowing the distance D permits the calculation of the temperature of the subject 102, $T_{surface}$. This method typically eliminates the need to use some or all of the offsets described above.

Figure 3:
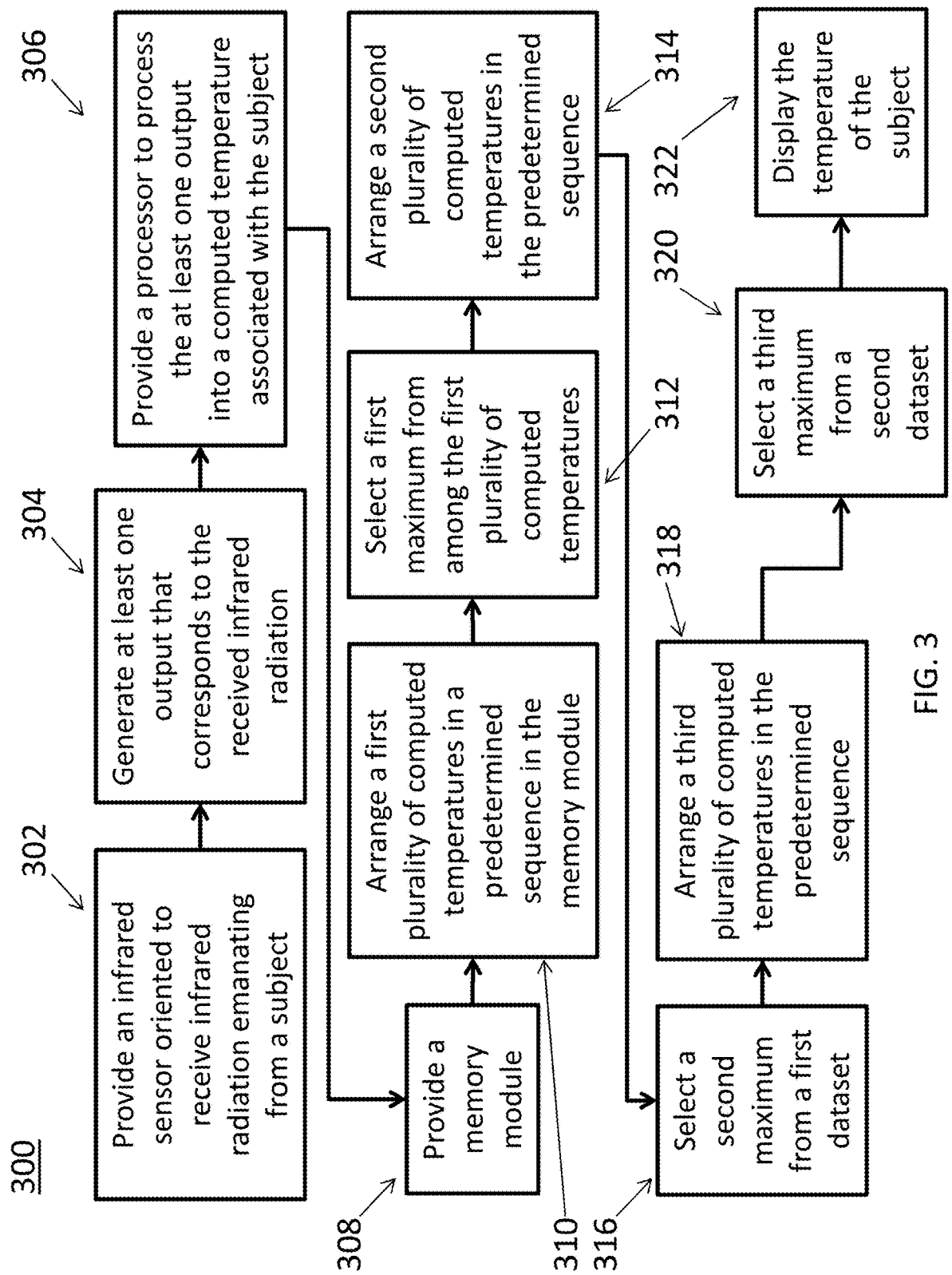
FIG. 3 is a flow chart illustrating steps of a method of measuring the temperature associated with a subject, according to some embodiments.

FIG. 3 is a flowchart depicting steps in a method 300 of determining the temperature of a subject, according to some embodiments. Methods consistent with method 300 may include at least one, but not all of the steps in method 300. At least some of the steps in method 300 may be performed by a processor circuit in a computer (e.g., processor 202), wherein the processor circuit is configured to execute instructions and commands stored in a memory (e.g., memory module 206). Further, methods consistent with the present disclosure may include at least some of the steps in method 300 performed in a different sequence. For example, in some embodiments a method may include at least some of the steps in method 300 performed in parallel, simultaneously, almost simultaneously, or overlapping in time.

Step 302 includes providing an infrared sensor oriented to receive infrared radiation emanating from the subject.

Step 304 includes the infrared sensor generating at least one output that corresponds to the received infrared radiation.

Step 306 includes providing a processor to compute a temperature associated with the subject based at least in part on the at least one output.

Step 308 includes providing a memory module.

Step 310 includes arranging a first plurality of computed temperatures in a predetermined sequence in the memory module.

Step 312 includes selecting a first maximum from among the first plurality of computed temperatures.

Step 314 includes arranging a second plurality of computed temperatures in the predetermined sequence in the memory module.

Step 316 includes selecting a second maximum from a first dataset, the first dataset comprising elements including the first maximum and the second plurality of computed temperatures.

Step 318 includes arranging a third plurality of computed temperatures in the predetermined sequence in the memory module.

Step 320 includes selecting a third maximum from a second dataset, the second dataset comprising elements including the second maximum and the third plurality of computed temperatures.

Step 322 includes displaying the temperature of the subject that is based at least in part on at least one of the first maximum, the second maximum, and the third maximum.

In some embodiments step 316 further comprises comparing each element in the first dataset with at least one nearest neighbor element in the first dataset, and selecting, as the second maximum, the element in the first dataset that is greater than or equal to each of its nearest neighbor elements.

In some embodiments step 320 further comprises comparing each element in the second dataset with at least one nearest neighbor element in the second dataset, and selecting, as the third maximum, the element in the second dataset that is greater than or equal to each of its nearest neighbor elements.

To the extent that the term "include," "have," or the like is used in the description or the claims, such term is intended to be inclusive in a manner similar to the term "comprise" as "comprise" is interpreted when employed as a transitional word in a claim.

The word "exemplary" is used herein to mean "serving as an example, instance, or illustration." Any embodiment described herein as "exemplary" is not necessarily to be construed as preferred or advantageous over other embodiments. Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A reference to an element in the singular is not intended to mean "one and only one" unless specifically stated, but rather "one or more." The term "some" refers to one or more. Underlined and/or italicized headings and subheadings are used for convenience only, do not limit the subject technology, and are not referred to in connection with the interpretation of the description of the subject technology. Relational terms such as first and second and the like may be used to distinguish one entity or action from another without necessarily requiring or implying any actual such relationship or order between such entities or actions. All structural and functional equivalents to the elements of the various configurations described throughout this disclosure that are known or later come to be known to those of ordinary skill in the art are expressly incorporated herein by reference and intended to be encompassed by the subject technology. Moreover, nothing disclosed herein is intended to be dedicated to the public regardless of whether such disclosure is explicitly recited in the above description. No claim element is to be construed under the provisions of 35 U.S.C. § 112(f), unless the element is expressly recited using the phrase "means for" or, in the case of a method claim, the element is recited using the phrase "step for."

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter of this specification has been described in terms of particular aspects, but other aspects can be implemented and are within the scope of the following claims. For example, while operations are depicted in the drawings in a particular order, this should not be understood as requiring that such operations be performed in the particular order shown or in sequential order, or that all illustrated operations be performed, to achieve desirable results. The actions recited in the claims can be performed in a different order and still achieve desirable results. As one example, the processes depicted in the accompanying figures do not necessarily require the particular order shown, or sequential order, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language claims and to encompass all legal equivalents. Notwithstanding, none of the claims are intended to embrace subject matter that fails to satisfy the requirements of the applicable patent law, nor should they be interpreted in such a way.

The invention claimed is:

1. A method of determining a temperature of a subject, comprising the steps of:
   providing an infrared sensor oriented to receive infrared radiation emanating from the subject;
   generating, by the infrared sensor, at least one output that corresponds to the received infrared radiation;
   providing a processor to process the at least one output into a computed temperature of the subject;
   adjusting the computed temperature based on an emissivity of the subject, the emissivity determined at least in part by a luminance value based at least in part on an image of the subject;
   providing a memory module;
   providing a display;
   arranging a first plurality of computed temperatures in a predetermined sequence in the memory module;
   selecting a first maximum from among the first plurality of computed temperatures;
   arranging a second plurality of computed temperatures in the predetermined sequence in the memory module;
   constructing a first dataset that includes elements comprising the first maximum and the second plurality of computed temperatures;
   selecting a second maximum from the first dataset;
   arranging a third plurality of computed temperatures in the predetermined sequence in the memory module;
   constructing a second dataset that includes elements comprising the second maximum and the third plurality of computed temperatures;
   selecting a third maximum from the second dataset; and
   displaying on the display the temperature of the subject that is based at least in part on at least one of the first maximum, the second, maximum, and the third maximum.

2. The method of claim 1, wherein the step of selecting a second maximum comprises the steps of:
   comparing each element in the first dataset with at least one nearest neighbor element in the first dataset; and
   selecting, as the second maximum, the element in the first dataset that is greater than or equal to each of its nearest neighbor elements.

3. The method of claim 2 wherein the step of selecting a third maximum comprises the steps of:
   comparing each element in the second dataset with at least one nearest neighbor element in the second dataset; and
   selecting, as the third maximum, the element in the second dataset that is greater than or equal to each of its nearest neighbor elements.

* * * * *